United States Patent
Senoo

(10) Patent No.: US 12,470,159 B2
(45) Date of Patent: Nov. 11, 2025

(54) CONTROL DEVICE FOR SYNCHRONOUS MOTOR

(71) Applicant: Fanuc Corporation, Yamanashi (JP)

(72) Inventor: Tatsuya Senoo, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 121 days.

(21) Appl. No.: 18/279,271

(22) PCT Filed: Mar. 22, 2022

(86) PCT No.: PCT/JP2022/013130
§ 371 (c)(1),
(2) Date: Aug. 29, 2023

(87) PCT Pub. No.: WO2022/202806
PCT Pub. Date: Sep. 29, 2022

(65) Prior Publication Data
US 2024/0171097 A1   May 23, 2024

(30) Foreign Application Priority Data
Mar. 26, 2021 (JP) ................................. 2021-053884

(51) Int. Cl.
*H02P 6/16* (2016.01)
*H02P 6/185* (2016.01)
(Continued)

(52) U.S. Cl.
CPC ................ *H02P 6/185* (2013.01); *H02P 6/28* (2016.02); *H02P 2207/05* (2013.01)

(58) Field of Classification Search
CPC .... H02P 6/16; H02P 6/185; H02P 6/32; H02P 6/28; H02P 2207/05
(Continued)

(56) References Cited

U.S. PATENT DOCUMENTS

| 9,331,618 B2 * | 5/2016 | Sonoda .................. H02P 21/32 |
| 2005/0156555 A1 | 7/2005 | Iwashita et al. |

(Continued)

FOREIGN PATENT DOCUMENTS

| JP | 06335273 A | 12/1994 |
| JP | 07111794 A | 4/1995 |

(Continued)

OTHER PUBLICATIONS

International Search Report and Written Opinion for International Application No. PCT/JP2022/013130, dated May 31, 2022, 5 pages.

*Primary Examiner* — Gabriel Agared

(74) *Attorney, Agent, or Firm* — Buchanan Ingersoll & Rooney PC

(57) ABSTRACT

Provided is a control device for a synchronous motor, the control device including a DC excitation command generation unit which generates a command for sending a DC current with a fixed current phase to a synchronous motor, and controls the magnitude of the DC current so as to apply deceleration torque to a rotor of the synchronous motor on the basis of at least one among the angular acceleration and the angular velocity of the rotor; and a magnetic pole position acquisition unit that acquires, as information indicating the magnetic pole position, the angular position of the rotor based on the output signal when a predetermined detection end condition is satisfied.

10 Claims, 8 Drawing Sheets

(51) Int. Cl.
*H02P 6/28* (2016.01)
*H02P 6/32* (2016.01)

(58) Field of Classification Search
USPC .......................................... 318/700
See application file for complete search history.

(56) References Cited

U.S. PATENT DOCUMENTS

| | | | | |
|---|---|---|---|---|
| 2014/0152204 | A1* | 6/2014 | Sonoda | H02P 21/34 |
| | | | | 318/400.02 |
| 2014/0292237 | A1* | 10/2014 | Yamazaki | H02P 6/32 |
| | | | | 318/400.33 |
| 2015/0372628 | A1* | 12/2015 | Oono | H02P 21/05 |
| | | | | 318/801 |
| 2018/0076750 | A1* | 3/2018 | Yoshida | H02P 21/0021 |
| 2018/0175751 | A1* | 6/2018 | Yoshida | H02P 3/025 |
| 2020/0119677 | A1* | 4/2020 | Takahashi | H02P 21/32 |

FOREIGN PATENT DOCUMENTS

| | | |
|---|---|---|
| JP | 2001103784 A | 4/2001 |
| JP | 2004140962 A | 5/2004 |
| JP | 2005204406 A | 7/2005 |

\* cited by examiner

CONTROL DEVICE FOR SYNCHRONOUS MOTOR

CROSS REFERENCE TO RELATED APPLICATIONS

This is the U.S. National Phase application of PCT/JP2022/013130, filed Mar. 22, 2022, which claims priority to Japanese Patent Application No. 2021-053884, filed Mar. 26, 2021, the disclosures of each of these applications being incorporated herein by reference in their entireties for all purposes.

FIELD OF THE INVENTION

The present invention relates to a control device for a synchronous motor.

BACKGROUND OF THE INVENTION

A synchronous motor passes current in a suitable phase according to a magnetic pole position of a rotor and generates desired torque. Such a synchronous motor requires detection of an angular difference between the magnetic pole position of the motor and a reference position of a position detection sensor (such as a rotary encoder), i.e., detection of an initial magnetic pole position. An initial magnetic pole position detection method based on direct-current excitation is known as a technique for detecting an initial magnetic pole position in a synchronous motor. The initial magnetic pole position detection method based on direct-current excitation uses a property that, by passing fixed exciting current in a fixed current phase through a motor, the rotor is attracted to an excitation phase position, oscillates, and finally stops at the excitation phase position.

In this respect, PTL 1 describes "a configuration for automatically performing a predetermined operation of, in a controller driving a servomotor, fixing the rotor magnetic pole position of the servomotor 1 at a predetermined position by the controller by using direct-current excitation, detecting the angular difference between the position and a position acquired from an incremental encoder 2 being attached to the servomotor 1 and having a reference position signal as the origin, and storing the difference into an EEROM 11 in the controller" (Abstract).

Further, PTL 2 describes "a brushless direct-current motor including: a permanent magnet rotor including a plurality of magnetic poles; a multi-phase stator winding placed on the permanent magnet rotor with a predetermined space; a sensor means for generating a multi-phase sensor signal according to rotation of the permanent magnet rotor; a direction detection means for detecting the direction of rotation of the permanent magnet rotor from the multi-phase sensor signal and outputting a direction signal; an initial position detection means for detecting an initial position of the permanent magnet rotor by varying an amplitude value and a phase value of a first multi-phase position signal, based on the sensor signal and the direction signal; a position detection means for generating a second multi-phase position signal, based on the initial position, at least the one sensor signal, and the direction signal; and an electric power supply means for supplying electric power to the stator winding, based on the first multi-phase position signal and the second multi-phase position signal" (claim 1).

PATENT LITERATURE

[PTL 1] Japanese Unexamined Patent Publication (Kokai) No. 2001-103784 A

[PTL 2] Japanese Unexamined Patent Publication (Kokai) No. H07-111794 A

SUMMARY OF THE INVENTION

A rotor exhibits behavior of being attracted to an excitation phase position and oscillating while fixed exciting current in a fixed current phase flows in direct-current excitation. The oscillation in this case is desirably as weak as possible. For example, the rotation range of a rotor may be limited, depending on a use to which a synchronous motor is applied, as is the case with a synchronous motor used for a drive shaft slanting a table of a machine tool, and therefore reduction in oscillation during direct-current excitation is yet more necessary.

An embodiment of the present disclosure is a control device for a synchronous motor including: a direct-current excitation command generation unit configured to generate a command for passing direct current in a fixed current phase through the synchronous motor and control magnitude of the direct current in such a way as to apply deceleration torque to the rotor, based on at least either of angular acceleration and angular velocity of the rotor; and a magnetic pole position acquisition unit configured to acquire, as information representing a magnetic pole position, an angular position of the rotor based on the output signal when a predetermined detection ending condition is satisfied.

In magnetic pole position detection based on direct-current excitation, amplitude of oscillation of a rotor can be reduced, thereby enabling shortening of the time required for the magnetic pole position detection.

The objects, the features, and the advantages of the present invention, and other objects, features, and advantages will become more apparent from the detailed description of typical embodiments of the present invention illustrated in accompanying drawings.

DETAILED DESCRIPTION OF EMBODIMENTS OF THE INVENTION

Figure 1:
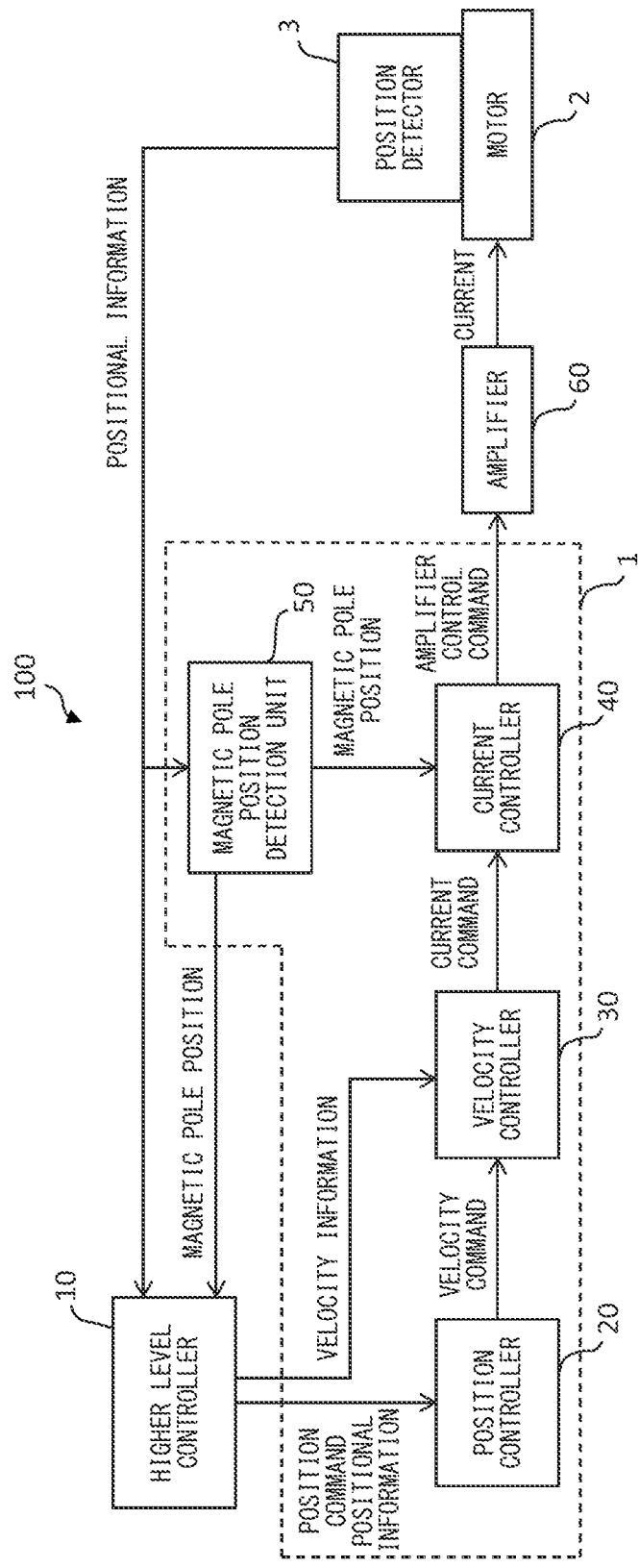
FIG. 1 is a diagram illustrating a configuration of a motor control device according to an embodiment.

Next, an embodiment of the present disclosure will be described, with reference to drawings. In referenced drawings, similar components or functional parts are given similar reference signs. In order to facilitate understanding, the drawings use different scales as appropriate. Further, the embodiment illustrated in the drawings is an example of implementation of the present invention, and the present invention is not limited to the illustrated embodiment.

FIG. 1 is a diagram illustrating a configuration of a motor control device 100 according to an embodiment. As illustrated in FIG. 1, the motor control device 100 includes a higher level controller 10, a position controller 20, a velocity controller 30, a current controller 40, an amplifier 60, and a motor 2. The motor 2 is a synchronous motor including a rotor and a stator provided with a winding. The motor 2 includes a position detector 3 as a sensor for detecting a rotor position (magnetic pole position).

For example, the higher level controller 10 is a computer numerical controller (CNC) and controls the operation of the motor 2 used in a machine tool or the like. For example, the higher level controller 10 transmits a command for controlling the operation of the motor 2 in such a way as to suitably operate the machine tool in accordance with a machining program. The higher level controller 10 may be configured as a common computer including a CPU, a ROM, a RAM, a storage, an operation unit, a display unit, an input-output interface, a network interface, and the like.

A position command transmitted from the higher level controller 10 is input to the position controller 20. The position controller 20 calculates the deviation between positional information acquired from a position signal fed back from the position detector 3 in the motor 2, and the position command. Then, the position controller 20 calculates a velocity command by multiplying the position deviation by a position loop gain and transmits the velocity command to the velocity controller 30.

The velocity controller 30 calculates the velocity deviation between velocity information acquired from the position signal fed back from the position detector 3 in the motor 2, and the velocity command. Then, for example, based on the velocity deviation, the velocity controller 30 calculates a current command by proportional-integral control and transmits the current command to the current controller 40.

The current controller 40 generates a control command directed to the amplifier 60, based on the input current command, information about current flowing through the stator of the motor 2, the information being fed back from the amplifier, and information about the rotor position detected by the position detector 3.

The amplifier 60 supplies drive current related to the operation of the rotor of the motor 2 to the motor 2 in accordance with the control command from the current controller 40. The amplifier 60 includes an inverter (three-phase inverter) composed of a full-bridge circuit based on semiconductor switching elements and outputs three-phase current for controlling the motor 2, based on the control command from the current controller 40.

In the configuration in FIG. 1, the position controller 20, the velocity controller 30, the current controller 40, and a magnetic pole position detection unit 50 may be provided by a microcontroller 1 in which a CPU core, a memory, a function for interfacing with external equipment, and the like are integrated. In other words, the position controller 20, the velocity controller 30, the current controller 40, and the magnetic pole position detection unit 50 can be provided as functions of software executed under control of the CPU in the microcontroller 1 in this case. Alternatively, each functional block may be provided mainly based on a hardware configuration such as an application specific integrated circuit (ASIC).

In order to suitably control the operation of the motor 2, the position (magnetic pole position) of the rotor needs to be recognized. As an exemplification, it is assumed in the present embodiment that the position detector 3 outputs signals indicating positional information of the rotor (an A-phase signal and a B-phase signal) and a reference position signal indicating a reference position. In this case, the magnetic pole position detection unit 50 acquires the angular difference between the reference position of the position detector 3 and the magnetic pole position of the rotor of the motor 2. Thus, the magnetic pole position of the rotor can be recognized in the motor control device 100.

The magnetic pole position detection unit 50 detects the angular difference by executing a magnetic pole position detection operation described below. In order to detect the magnetic pole position, the magnetic pole position detection unit 50 applies direct-current excitation for detection of the magnetic pole position by passing exciting current in a fixed current phase through the stator of the motor 2. The motor control device 100 according to the present embodiment is configured to reduce the magnitude of oscillation of the rotor in detection of the magnetic pole position in direct-current excitation and reduce the time required for the magnetic pole detection operation in the direct-current excitation.

Figure 2:
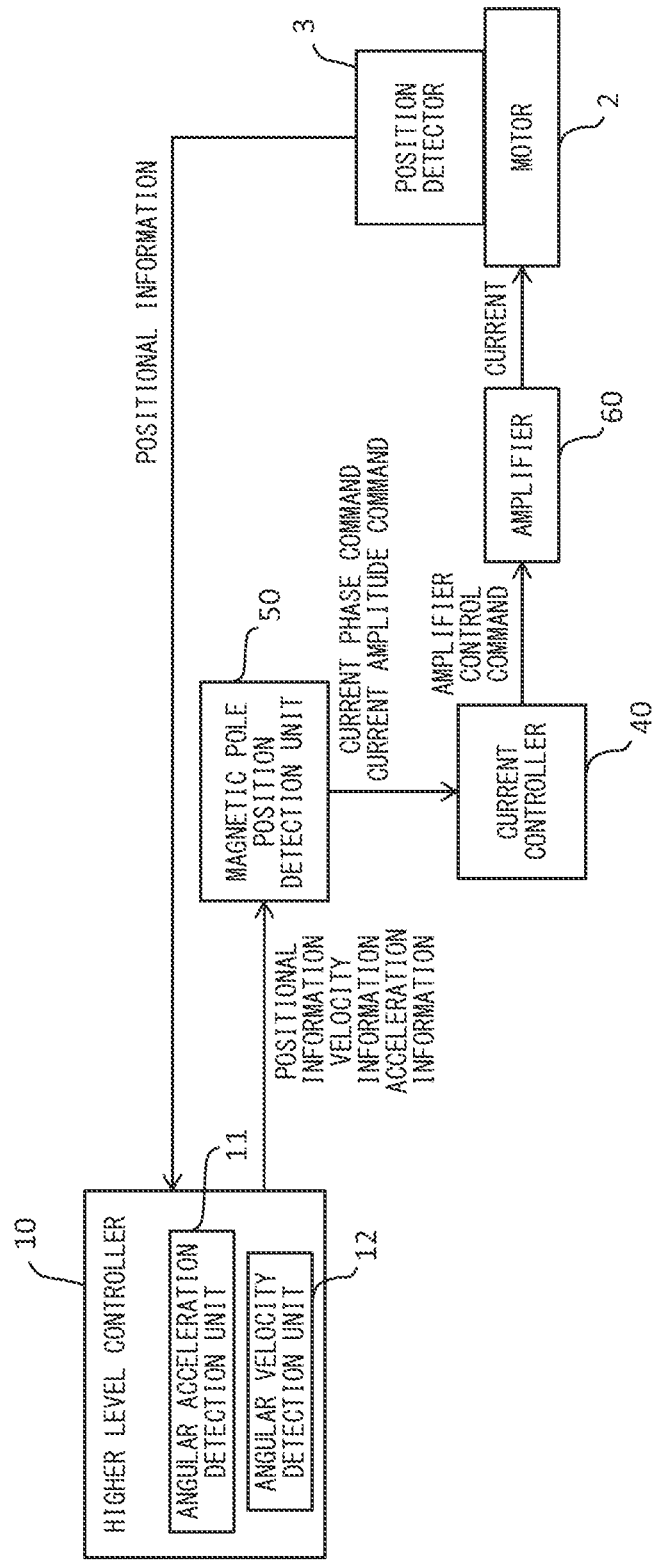
FIG. 2 is a functional configuration diagram when a magnetic pole position detection operation is executed in the motor control device.

FIG. 2 is a functional configuration diagram focusing on functions when the magnetic pole position detection operation is executed in the motor control device 100 illustrated in FIG. 1. As illustrated in FIG. 2, when the magnetic pole position detection operation is performed, the magnetic pole position detection unit 50 inputs a current phase command for exciting the stator in a fixed current phase and a current amplitude command specifying a value (amplitude) of the exciting current to the current controller 40. The current controller 40 transmits a control command directed to the amplifier 60, based on the current phase command input from the magnetic pole position detection unit 50, the current amplitude command, and information fed back from the amplifier 60 about current flowing through the stator. The amplifier 60 supplies drive current to the motor 2 in accordance with the control command from the current controller 40.

Further, the higher level controller 10 includes an angular acceleration detection unit 11 calculating the angular acceleration of the rotor, based on positional information of the rotor being output information of the position detector 3, and an angular velocity detection unit 12 calculating the angular velocity of the rotor, based on the positional information from the position detector 3.

Figure 3:
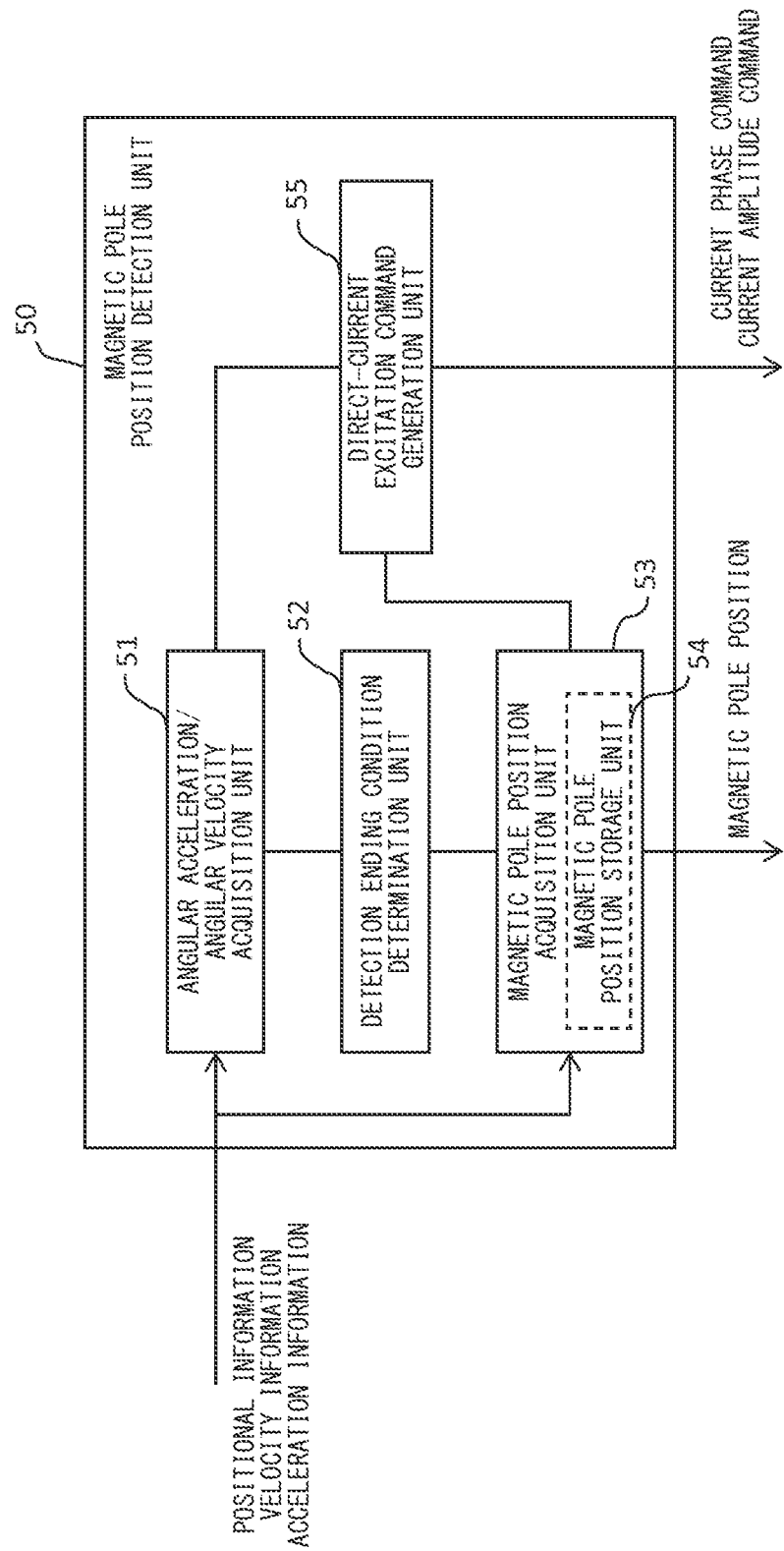
FIG. 3 is a block diagram functionally illustrating a configuration of a magnetic pole position detection unit.

The magnetic pole position detection unit 50 according to the present embodiment is configured to reduce the amplitude of oscillation of the rotor during direct-current excitation compared with an initial magnetic pole position detection method based on conventional direct-current excitation continuously passing fixed current in a fixed current phase, by applying deceleration torque to the rotor by controlling the magnitude of current flowing through the motor 2 during direct-current excitation by using at least either of the angular acceleration and the angular velocity of the rotor, thereby enabling shortening of the time required for the initial magnetic pole position detection. FIG. 3 is a block diagram functionally illustrating a configuration of the magnetic pole position detection unit 50 according to the present embodiment. As illustrated in FIG. 3, the magnetic pole position detection unit 50 includes a direct-current excitation command generation unit 55, an angular acceleration/angular velocity acquisition unit 51, a detection ending condition determination unit 52, and a magnetic pole position acquisition unit 53.

The direct-current excitation command generation unit 55 generates commands (a current phase command and a current amplitude command) related to direct current passed through the motor 2 during the direct-current excitation operation.

The angular acceleration/angular velocity acquisition unit 51 acquires the angular acceleration and the angular velocity of the rotor of the motor 2 from the higher level controller 10.

The detection ending condition determination unit 52 determines whether a predetermined condition for ending the magnetic pole position detection operation based on direct-current excitation is met.

When the condition for ending the magnetic pole position detection operation is satisfied, the magnetic pole position acquisition unit 53 assumes that the magnetic pole position is detected (the magnetic pole position matches the excitation phase) and stores the angular position according to the position detector 3 at this time into a magnetic pole position storage unit 54 as information representing the angular difference between the reference position according to the position detector 3 and the magnetic pole position. By using the thus stored angular difference, the motor control device 100 can recognize the current position of the rotor (magnetic pole position) from the output signal of the position detector 3. The magnetic pole position detection unit 50 provides the angular difference stored as described above to the higher level controller 10, the current controller 40, and the like as information representing the magnetic pole position.

A magnetic pole position detection operation by the magnetic pole position detection unit 50 according to the present embodiment will be described below. First, for understanding of the magnetic pole position detection operation by the magnetic pole position detection unit 50 according to the present embodiment, operating waveforms in an initial magnetic pole position detection method based on common direct-current excitation by continuously passing fixed exciting current are illustrated as a comparative example.

Figure 4:
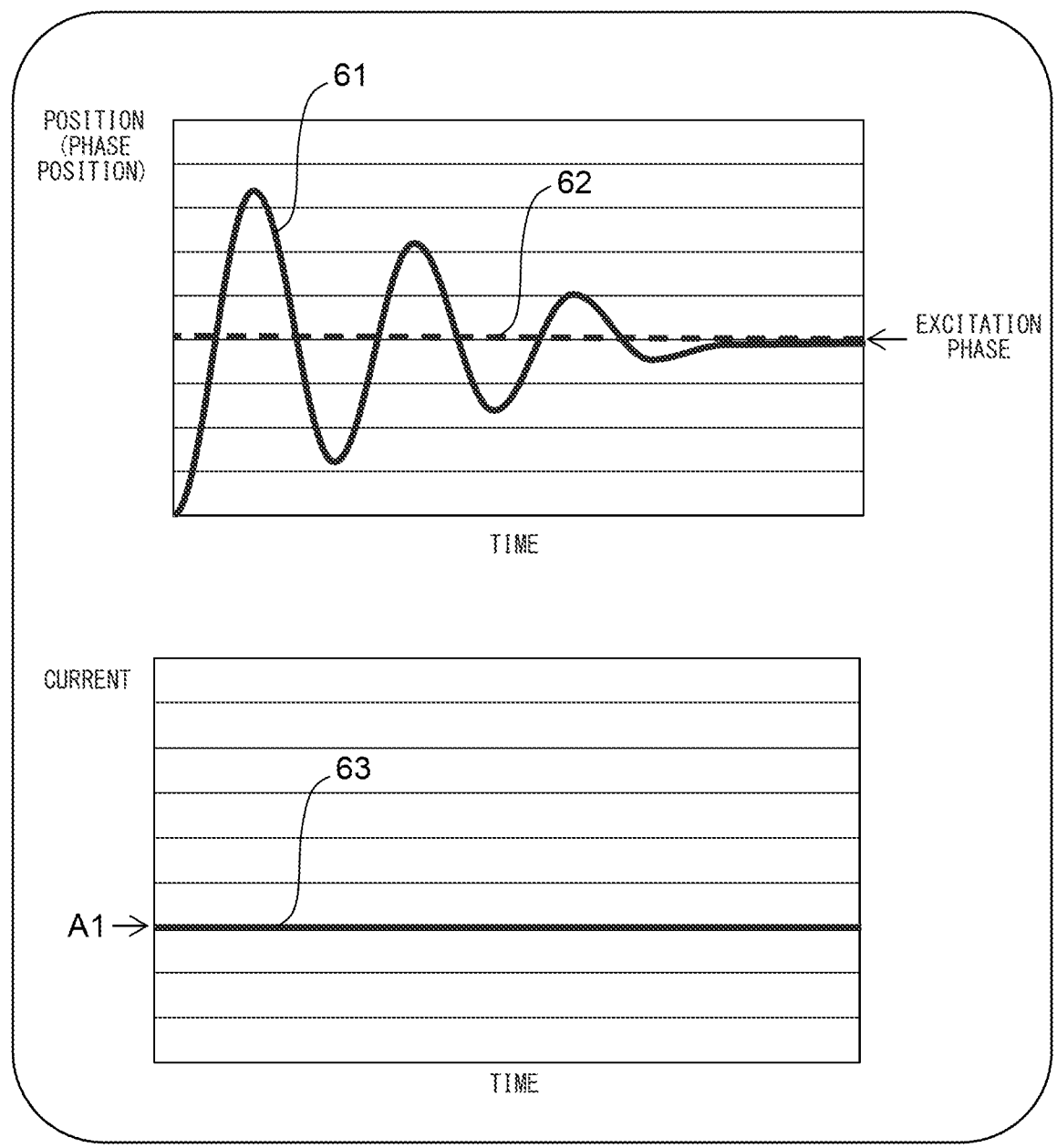
FIG. 4 illustrates graphs representing behavior of a rotor and exciting current in conventional direct-current excitation as a comparative example.

A graph 61 representing the rotor position when the initial magnetic pole position detection based on the common direct-current excitation is performed is illustrated in an upper section of FIG. 4. Further, a graph representing the magnitude of exciting current when the common direct-current excitation is performed is illustrated in a lower section of FIG. 4. As illustrated in FIG. 4, when the common direct-current excitation is started, the rotor exhibits behavior of starting movement by being attracted to the position of a fixed excitation phase and oscillating around the position of the excitation phase (given a sign 62). The oscillation gradually attenuates, and the rotor finally stops at the position of the excitation phase. As illustrated in the lower section of FIG. 4, the exciting current (given a sign 63) during the common direct-current excitation is fixed at a current value A1.

Figure 5:
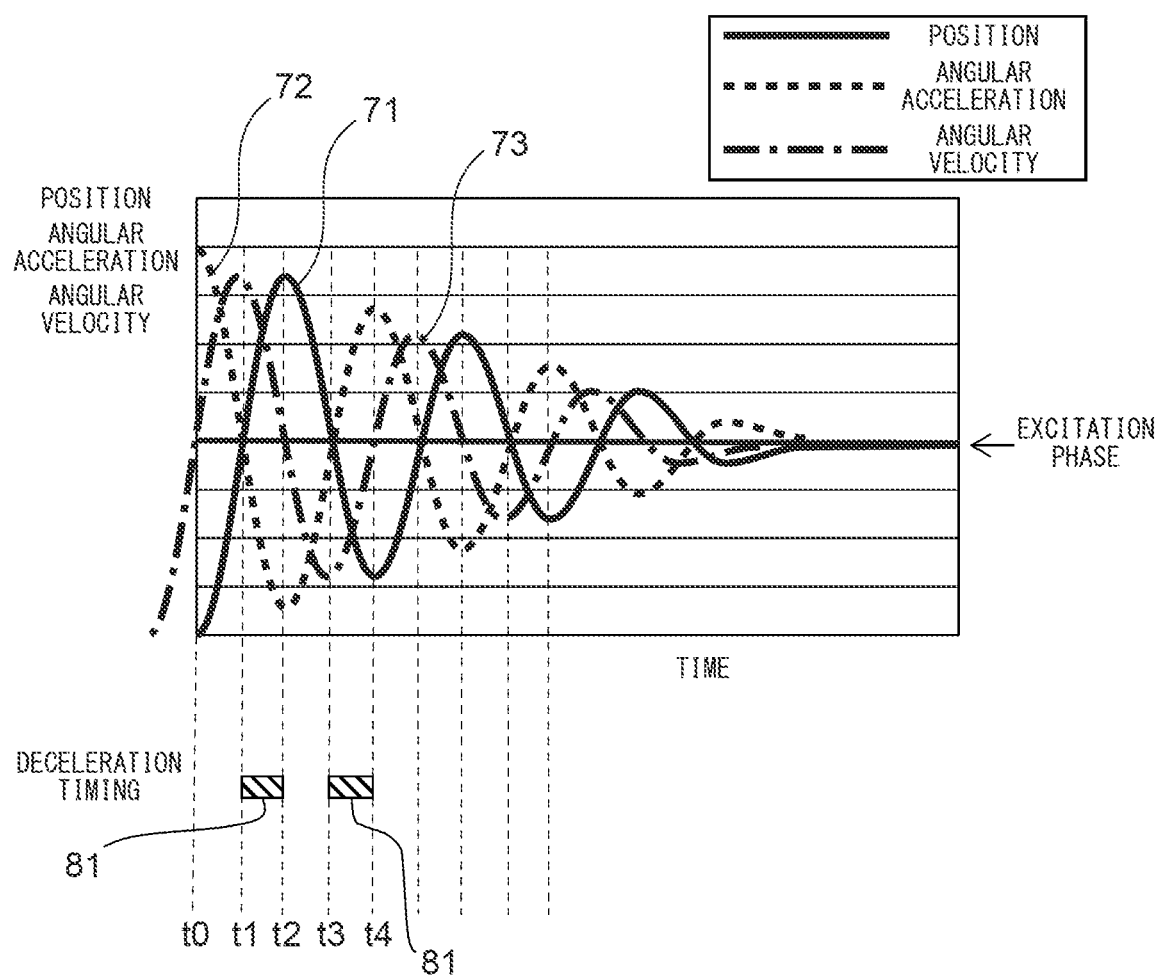
FIG. 5 is a diagram illustrating a timing for generating deceleration torque according to the present embodiment.
Figure 6:
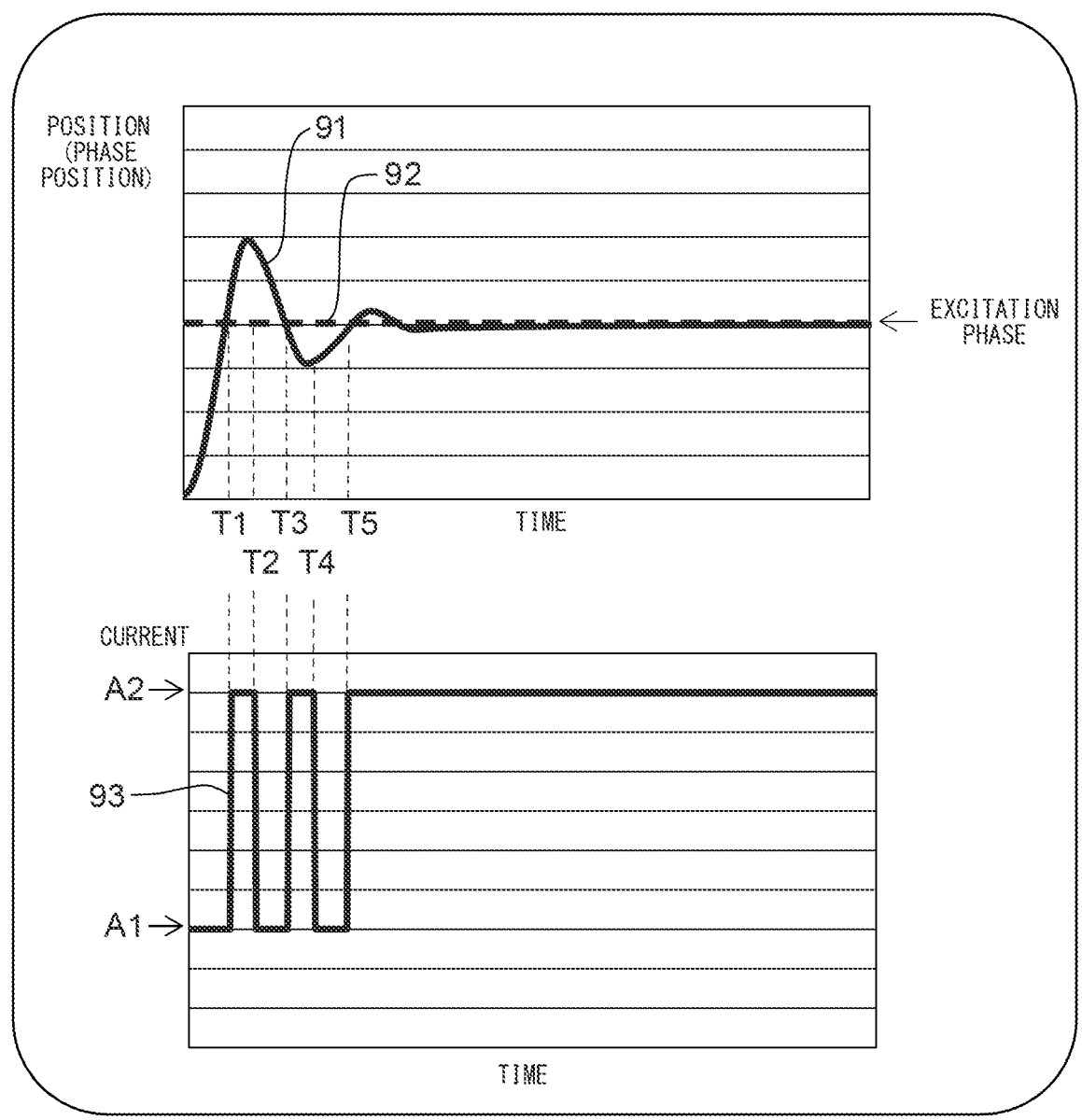
FIG. 6 illustrates graphs representing behavior of a rotor and exciting current in direct-current excitation according to the present embodiment.

On the other hand, the magnetic pole position detection unit 50 according to the present embodiment controls current passed through the motor 2 during the initial magnetic pole position detection operation in such a way as to apply deceleration torque (generate or increase deceleration torque) to the rotor, based on the acceleration of the rotor, as illustrated in a lower section of FIG. 6 as an example. Thus, as illustrated in an upper section of FIG. 5, the amplitude of oscillation of the rotor in the initial magnetic pole position detection operation is reduced compared with the state based on the conventional direct-current excitation as illustrated in the upper section of FIG. 4, thereby shortening the time required for the initial magnetic pole position detection operation as well. Details of the operation of the magnetic pole position detection unit 50 will be described below.

In order to apply deceleration torque to the rotor oscillating as illustrated in the upper section of FIG. 4 when continuously passing fixed exciting current in a fixed current phase through the motor 2, the direct-current excitation command generation unit 55 in the magnetic pole position detection unit 50 according to the present embodiment applies operation patterns as follows, as specific current control operation patterns.

Operation Pattern A:
  Start of an operation of applying deceleration torque: when the polarity of the angular acceleration of the rotor is reversed
  End of the operation of applying deceleration torque: when the polarity of the angular velocity of the rotor is reversed Operation Pattern B:
  Start of the operation of applying deceleration torque: when the polarity of the angular acceleration of the rotor is reversed
  End of the operation of applying deceleration torque: when a certain amount of time elapses after applying deceleration torque The certain amount of time is determined in such a way that the time during which deceleration torque is applied is not unnecessarily long. For example, the certain amount of time is preferably set to be equal to or less than an expected amount of time between the start of the operation of applying deceleration torque and the next reversal of the polarity of the angular velocity. The magnetic pole position detection unit 50 repeats an operation based on the aforementioned operation pattern A or the operation pattern B until the detection ending condition determination unit determines that an ending condition is satisfied.

The detection ending condition is a condition satisfying a state in which oscillation of the rotor is attenuated and the rotor is considered to be in the neighborhood of the excitation phase. Examples of the detection ending condition include the following conditions.

(a1) A state in which at least either of the angular acceleration and the angular velocity of the rotor is equal to or less than a predetermined threshold value.
  (a2) A state in which the angular acceleration of the rotor is equal to or less than a threshold value (first threshold value) and the angular velocity is equal to or less than a threshold value (second threshold value).
  (a3) A state in which increase and decrease of current is repeated a predetermined number of times from the start of the detection operation.

For example, peak values of the angular acceleration and the angular velocity are used in determination of whether the detection ending condition is satisfied.

FIG. 5 is a diagram illustrating a timing for applying deceleration torque in the aforementioned operation pattern A. FIG. 5 illustrates a graph 72 representing the angular acceleration of the rotor and a graph 73 representing the angular velocity in this case along with the graph 61 illustrated in the upper section of FIG. 4 representing the position of the rotor. As illustrated in FIG. 5, when the rotor position changes as illustrated in a graph 71, the angular acceleration changes as illustrated in the graph 72 and the angular velocity changes as illustrated in the graph 73. Accordingly, timings t1, t3, and the like when the polarity of the graph 72 representing the angular acceleration is reversed in FIG. may correspond to timings when deceleration torque is applied. Further, timings t2, t4, and the like when the polarity of the graph 73 representing the angular velocity is reversed may correspond to timings when the operation of applying deceleration torque is stopped. With a sign 81, FIG. 5 illustrates an example of the timing when deceleration torque is applied.

FIG. 6 illustrates examples of data waveform diagrams when direct-current excitation for initial magnetic pole position detection is performed in accordance with the operation pattern A. A graph 91 representing the rotor position is illustrated in an upper section of FIG. 6, and a graph 93 representing exciting current in this case is illustrated in a lower section of FIG. 6. Further, a broken line given a sign 92 in the diagram represents the position of the excitation phase. As illustrated in the lower section of FIG. 6, the direct-current excitation operation is started at the exciting current A1 with the same amplitude as the conventional exciting current illustrated in FIG. 4. A timing T1 is a timing when the polarity of the angular acceleration of the rotor is reversed. Since deceleration torque is applied to the rotor (deceleration torque is increased) at the timing T1, the exciting current is increased to a current value A2. The period in which the current is increased is assumed to continue until a timing T2 being the next timing when the polarity of the angular velocity of the rotor is reversed. At the timing T2, the exciting current is returned to the original value A1 in order to release the increased deceleration torque.

At a timing T3 being the next timing when the polarity of the angular acceleration is reversed again, the exciting current is increased to the current value A2 again, and deceleration torque is applied (deceleration torque is increased). Then, at a timing T4 being the next timing when the polarity of the velocity of the rotor is reversed, the exciting current is returned to the original current value A1, and the operation of applying deceleration torque (increasing deceleration torque) is released.

Through the operation described above, the amplitude of oscillation of the rotor is sufficiently attenuated, and the position of the rotor is in a state of being close to the excitation phase; and for example, it is assumed that both the rotor velocity and the rotor acceleration fall below the respective threshold values and the detection ending condition is satisfied at a timing T5. The magnetic pole position detection unit 50 stores the position (angular position) of the rotor at this point in time into the magnetic pole position storage unit 54. While the exciting current is increased to the current value A2 from the timing when the initial magnetic pole position detection operation is ended in the operation example in FIG. 6, the oscillation of the rotor is sufficiently attenuated at the timing T5 or later, and therefore, the exciting current value at or later than the timing T5 is not limited to the above and, for example, may remain at the current value A1.

While the exciting current is returned to the current value A1 in a period (from the timing T2 to the timing T3) in which the operation of applying deceleration torque is released in the operation example in FIG. 6, the above is an exemplification, and the current value between the timings T2 and T3 has only to be a value less than the current value A2 and may be greater than the original current value A1.

Figure 7:
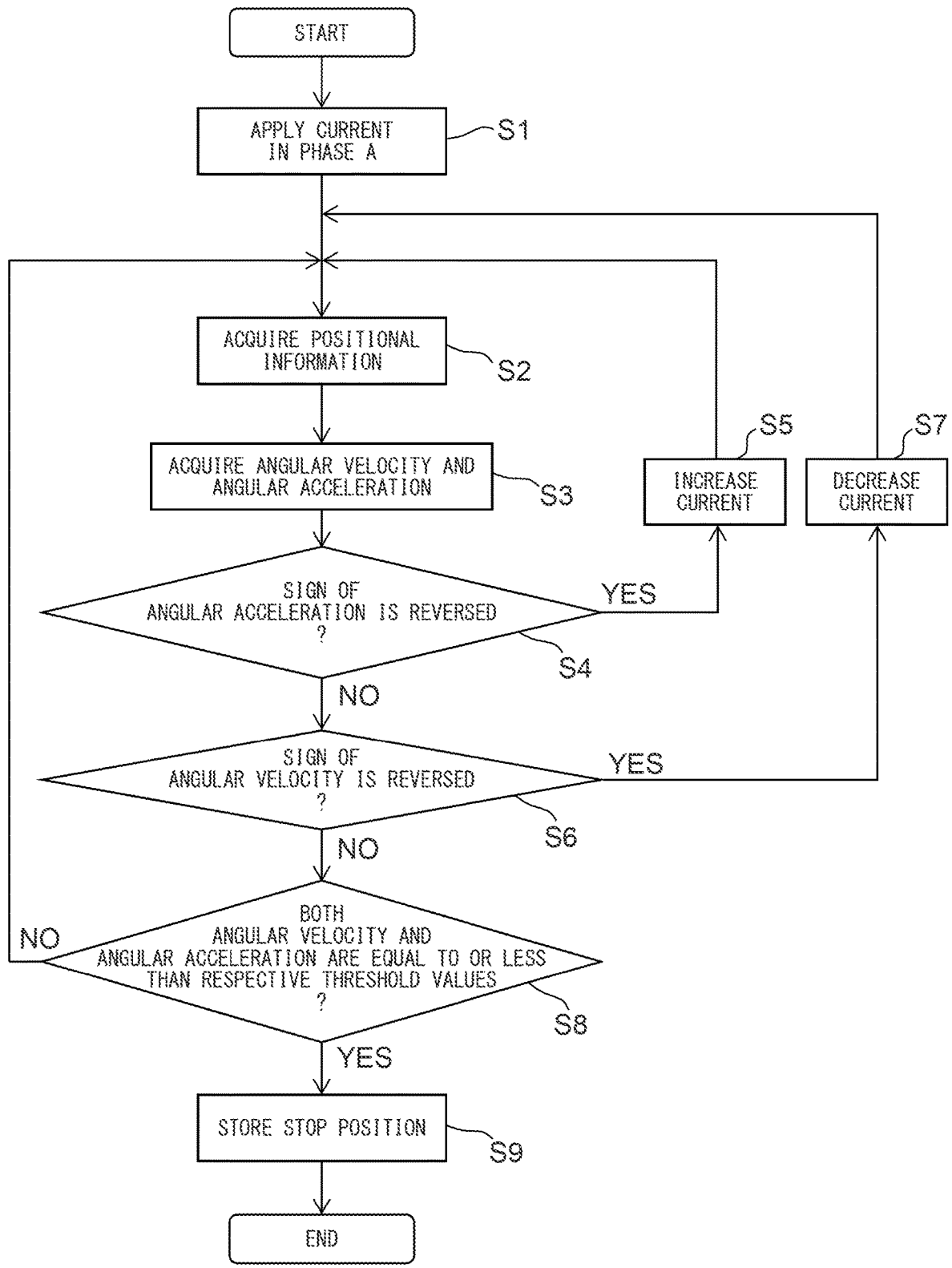
FIG. 7 is a flowchart illustrating the magnetic pole position detection operation according to the present embodiment.

FIG. 7 is a flowchart providing the magnetic pole position detection operation based on the aforementioned operation pattern A. The operation in FIG. 7 is executed under control of the CPU in the microcontroller 1.

First, the magnetic pole position detection unit 50 (the direct-current excitation command generation unit 55) passes exciting current in a fixed excitation phase (phase A) at the current value A1 through the motor 2 (step S1). Next, the magnetic pole position detection unit 50 acquires the positional information of the rotor from the output of the position detector 3 in the motor 2 or the higher level controller 10 (step S2). Next, the magnetic pole position detection unit 50 (the angular acceleration/angular velocity acquisition unit 51) acquires the angular acceleration and the angular velocity of the rotor from the higher level controller 10 (the angular acceleration detection unit 11 and the angular velocity detection unit 12) (step S3). The angular acceleration and the acceleration of the rotor may be calculated by the magnetic pole position detection unit 50 (the angular acceleration/angular velocity acquisition unit 51) from the positional information of the rotor.

Next, the magnetic pole position detection unit 50 (the direct-current excitation command generation unit 55) determines whether a polarity (sign) reversal of the angular acceleration of the rotor is occurring (step S4). When a polarity reversal of the angular acceleration of the rotor is occurring (S4: YES), the magnetic pole position detection unit 50 applies deceleration torque (increases deceleration torque) to the rotor by increasing the exciting current (increasing the current value from the current value A1 to the current value A2) (step S5). Next, the processing returns to step S2. Next, until the determination result in step S6 becomes a YES determination, a state in which the exciting current is increased to the current value A2 continues by continuation of a NO determination in step S8 (steps S2, S3, S4: NO, step S6: NO, step S8: NO). The operation here corresponds to the operation between the timings T1 and T2 in FIG. 6.

Next, when a polarity (sign) reversal of the angular velocity is detected in step S6 (S6: YES), the processing advances to step S7, and the magnetic pole position detection unit 50 decreases the exciting current (for example, down to the current value A1) (step S7). Then, the processing returns to step S2. Until another reversal of the angular acceleration is detected, a state in which the exciting current is reduced continues (steps S2, S3, S4: NO, step S6: NO, step S8: NO). The operation here corresponds to the operation between the timings T2 and T3 in FIG. 6.

Next, when a polarity reversal of the angular acceleration is detected again (S4: YES), the exciting current is increased to the current value A2 again (corresponding to the timing T3 in FIG. 6). Then, when a polarity reversal of the angular velocity is subsequently detected again (S6: YES), the exciting current is returned to the current value A1 again (corresponding to the timing T4 in FIG. 6). Then, when oscillation of the rotor is attenuated, and the detection ending condition (assumed to be both the angular velocity and the angular acceleration being equal to or less than respective threshold values) is satisfied in step S8 (S8: Yes), the rotor is assumed to have stopped, and the stop position of the rotor (the angular position indicated by the positional information of the rotor) is stored into the magnetic pole position storage unit 54 (step S9). In step S8, as an example, peak values of the angular velocity and the angular acceleration are detected, and whether the peak values of the angular velocity and the angular acceleration are equal to or less than the respective predetermined threshold values is determined.

By the operation flow described above, the amplitude of oscillation of the rotor (the angular width of rotation of the rotor) can be reduced, thereby enabling shortening of the time required for magnetic pole position detection, in the initial magnetic pole position detection operation based on direct-current excitation.

Next, modified examples related to the aforementioned operation pattern A will be described. The operation pattern A is an example of performing control of increasing current from the current value A1 to the current value A2 at once at timings (such as the timings T1 and T3) for applying (increasing) deceleration torque and decreasing the current from the current value A2 to the current value A1 at once at timings (such as the timings T2 and T4) for releasing deceleration torque, i.e., an example of varying current in a square wave shape. The modified examples described here are examples of providing a time constant in current value variation (i.e., varying a current value at a predetermined rate of change).

Figure 8:
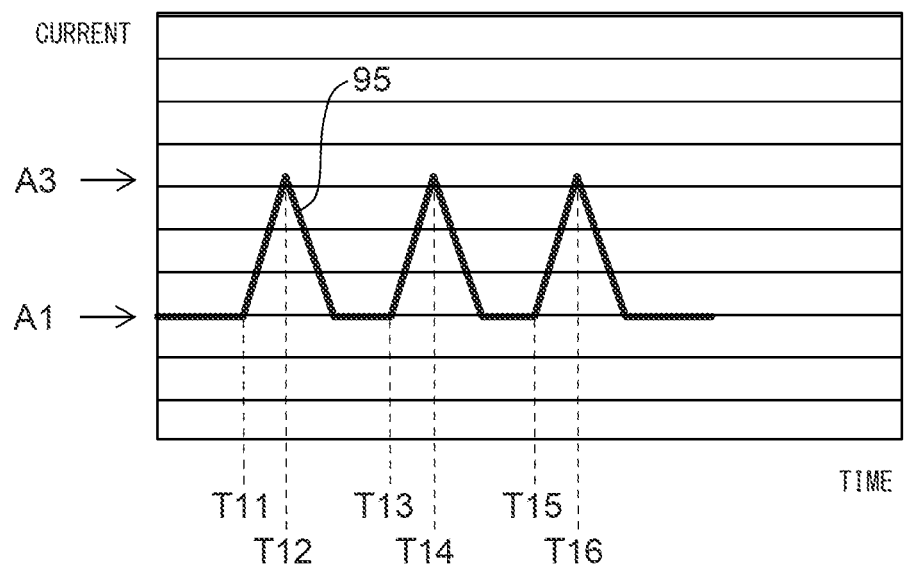
FIG. 8 is a graph illustrating a first modified example of current control in direct-current excitation.
Figure 9:
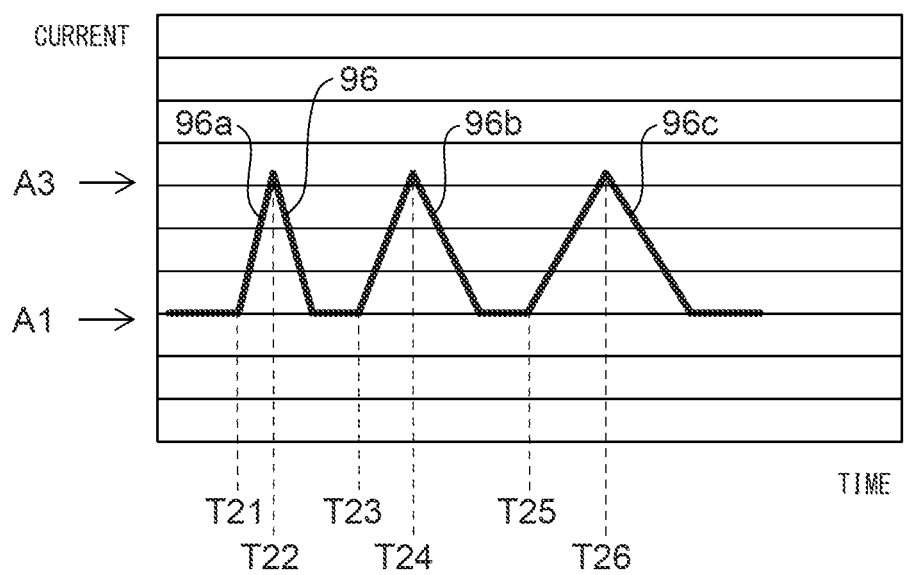
FIG. 9 is a graph illustrating a second modified example of current control in direct-current excitation.

FIG. 8 illustrates a current control pattern in a modified example 1. FIG. 9 illustrates a current control pattern in a modified example 2. Examples of repeating an operation of applying deceleration torque by current increase three times are described here.

A graph 95 illustrated in FIG. 8 represents a current control waveform based on the modified example 1. In the control based on the graph 95, a fixed time constant TC0 is provided in current variation. On the graph 95, a rise when exciting current is increased from a current value A1 to a current value A3 according to a polarity reversal of the angular acceleration is varied according to the time constant TC0. Further, the fall time when the exciting current is decreased from the current value A3 to the current value A1, based on detection of a polarity reversal of the angular velocity, falls at the same time constant TC0 as the rise time. Note that, on the graph 95 in FIG. 8, timings T11, T13, and T15 correspond to timings when the polarity of the angular acceleration is reversed, and timings T12, T14, and T16 correspond to timings when the polarity of the angular velocity is reversed.

Such provision of a time constant in variation of a current waveform enables avoidance of occurrence of a situation in which a shock is applied to the rotor due to sudden variation of current.

A graph 96 illustrated in FIG. 9 represents a current control waveform based on the modified example 2. In the current control illustrated in graph 96, a time constant is provided in current variation and the time constant is gradually varied (increased in this example). Denoting time constants in three generation parts of deceleration torque (chopping-wave-shaped parts 96a, 96b, and 96c) on the graph 96 of the current control based on the modified example 2 by TC1, TC2, and TC3, respectively, the time constants in this modified example 2 are controlled in such a way that

TC1<TC2<TC3 is met. Note that, on the graph 96 in FIG. 9, timings T21, T23, and T25 correspond to timings when the polarity of the angular acceleration is reversed, and timings T22, T24, and T26 correspond to timings when the polarity of the angular velocity is reversed.

Gradual increase in a time constant (gradually reducing a rate of change) of current variation as is the case in this example enables control of generating relatively sudden deceleration torque giving priority to oscillation reduction in an initial stage of current control and generating milder deceleration torque giving priority to shock reduction to the rotor in a subsequent stage.

As described above, the present embodiment reduces the amplitude of oscillation of the rotor in magnetic pole position detection based on direct-current excitation, thereby enabling shortening of the time required for the magnetic pole position detection.

While the present invention has been described above by using the typical embodiments, it may be understood by a person skilled in the art that changes, and various other changes, omissions, and additions can be made to the aforementioned embodiments without departing from the scope of the present invention.

The functional configurations illustrated in FIG. 1, FIG. 2, and FIG. 3 are exemplifications, and functional configuration examples may include various modified examples. For example, while a configuration example of the higher level controller 10 including the angular acceleration detector and the angular velocity detector is described in the aforementioned embodiment, the magnetic pole position detection unit may have functions as the angular acceleration detector and the angular velocity detector.

Velocity information of the rotor is not necessarily required when the magnetic pole position detection operation based on the operation pattern B according to the aforementioned embodiment is performed, and therefore, "(a peak value of) the angular acceleration is equal to or less than a predetermined threshold value" may be used as the detection operation ending condition for ending the magnetic pole position detection operation.

A program executing the processing of the magnetic pole position detection operation illustrated in FIG. 7 may be recorded on various computer-readable recording media (such as semiconductor memories such as a ROM, an EEPROM, and a flash memory, la magnetic recording medium, and optical disks such as a CD-ROM and a DVD-ROM).

REFERENCE SIGNS LIST

1 Microcontroller
2 Motor
3 Position detector
10 Higher level controller
20 Position controller3
30 Velocity controller
40 Current controller
50 Magnetic pole position detection unit
51 Angular acceleration/angular velocity acquisition unit
52 Detection ending condition determination unit
53 Magnetic pole position acquisition unit
54 Magnetic pole position storage unit
55 Direct-current excitation command generation unit
60 Amplifier
100 Motor control device

The invention claimed is:

1. A control device for a synchronous motor comprising:
a processor configured to:
generate a command for passing direct current in a fixed current phase through the synchronous motor and control magnitude of the direct current in such a way as to apply, during execution of a direct current excitation operation by the direct current, deceleration torque to a rotor of the synchronous motor, based on at least either of angular acceleration and angular velocity of the rotor; and acquire, as information representing a magnetic pole position, an angular position of the rotor based on an output signal of a position detector in the synchronous motor when a predetermined detection ending condition is satisfied.

2. A control device for a synchronous motor comprising:
a processor configured to:
generate a command for passing direct current in a fixed current phase through the synchronous motor and control magnitude of the direct current in such a way as to apply deceleration torque to a rotor of the synchronous motor, based on at lease either of angular acceleration and angular velocity of the rotor; and
acquire, as information representing a magnetic pole position, an angular position of the rotor based on an output signal of a position detector in the synchronous motor when a predetermined detection ending condition is satisfied, -wherein
the processor applies the deceleration torque by increasing magnitude of the direct current at a timing when polarity of the angular acceleration is reversed.

3. The control device for a synchronous motor according to claim 2, wherein
the processor reduces magnitude of the direct current at a timing when a predetermined amount of time elapses after increasing magnitude of the direct current.

4. A control device for a synchronous motor comprising:
a processor configured to:
generate a command for passing direct current in a fixed current phase through the synchronous motor and control magnitude of the direct current in such a way as to apply deceleration torque to a rotor of the synchronous motor, based on at least either of angular acceleration and angular velocity of the rotor;
acquire, as information representing a magnetic pole position, an angular position of the rotor based on an output signal of a position detector in the synchronous motor when a predetermined detection ending condition is satisfied;
detect angular acceleration of the rotor, based on the output signal of the position detector; and
detect angular velocity of the rotor, based on the output signal of the position detector, wherein
the processor applies the deceleration torque to the rotor by decreasing magnitude of the direct current at a timing when polarity of the angular velocity is reversed after increasing magnitude of the direct current at a timing when polarity of the angular acceleration is reversed.

5. The control device for a synchronous motor according to claim 4, wherein
the processor
first sets the direct current to a first current value,
sets the direct current to a second current value greater than the first current value at a timing when polarity of the angular acceleration is reversed, and
returns the direct current to the first current value at a timing when polarity of the angular velocity is subsequently reversed.

6. The control device for a synchronous motor according to claim 3, wherein
the processor continuously supplies the direct current at a fixed value to the synchronous motor after repeatedly executing, a plurality of times, an operation of increasing the direct current and subsequently decreasing the direct current.

7. The control device for a synchronous motor according to claim 3, wherein
the processor varies a current value at a predetermined rate of change when increasing and decreasing the direct current.

8. The control device for a synchronous motor according to claim 7, wherein
the processor varies the predetermined rate of change in such a way that a rate of increase and decrease of the direct current gradually decreases as time elapses when repeatedly executing, a plurality of times, an operation of increasing and decreasing the direct current.

9. The control device for a synchronous motor according to claim 1, wherein
the predetermined detection ending condition is that a peak value of the angular acceleration is equal to or less than a predetermined threshold value.

10. The control device for a synchronous motor according to claim 3, wherein
the predetermined detection ending condition is either of
(1) a peak value of the angular acceleration is equal to or less than a first threshold value and a peak value of the angular velocity is equal to or less than a second threshold value, and
(2) a repetition count of an operation of increasing magnitude of the direct current and subsequently decreasing magnitude of the direct current reaches a predetermined number.

* * * * *